(No Model.)

2 Sheets—Sheet 1.

D. TARR.
BALING MACHINE.

No. 292,872. Patented Feb. 5, 1884.

Witnesses:
O. M. Smith
A. G. Smith

Inventor.
Daniel Tarr (No Model.) 2 Sheets—Sheet 2.

D. TARR.
BALING MACHINE.

No. 292,872. Patented Feb. 5, 1884.

Witnesses:
O. W. Smith
A. I. Smith

Inventor.
Daniel Tarr

UNITED STATES PATENT OFFICE.

DANIEL TARR, OF WELLSVILLE, OHIO.

BALING-MACHINE.

SPECIFICATION forming part of Letters Patent No. 292,872, dated February 5, 1884.

Application filed June 7, 1883. (No model.)

*To all whom it may concern:*

Be it known that I, DANIEL TARR, a citizen of the United States, residing in Wellsville, in the county of Columbiana and State of Ohio, have invented a new and useful Baling-Machine, of which the following is a specification.

My invention relates to an improvement in baling-machines, by which hay, straw, &c., are packed by a rolling process. I attain this by means of the mechanism illustrated in the accompanying drawings, in which—

Figure 1:
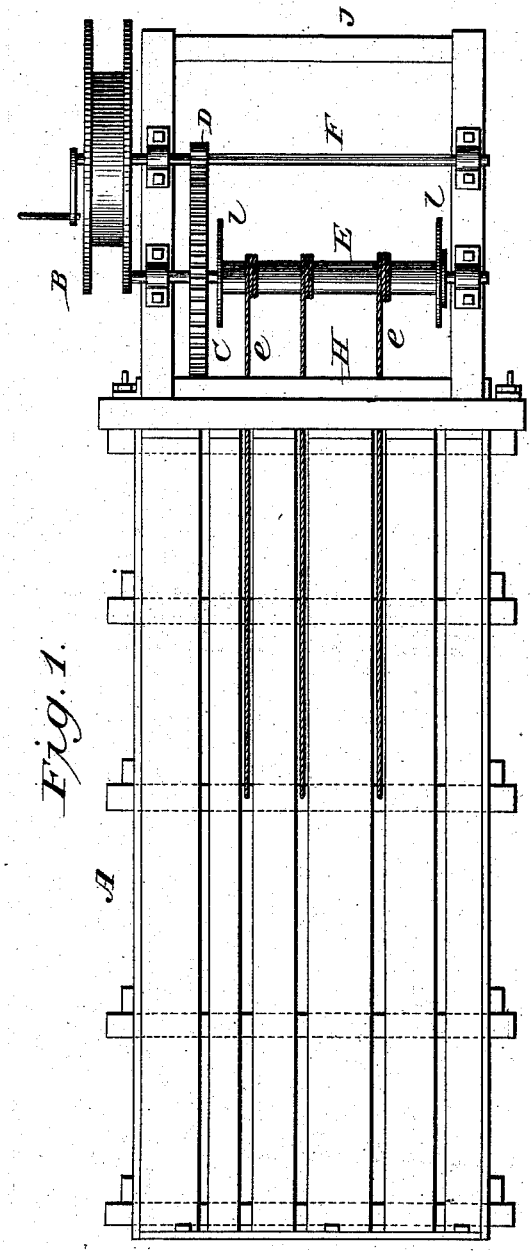
Figure 2:
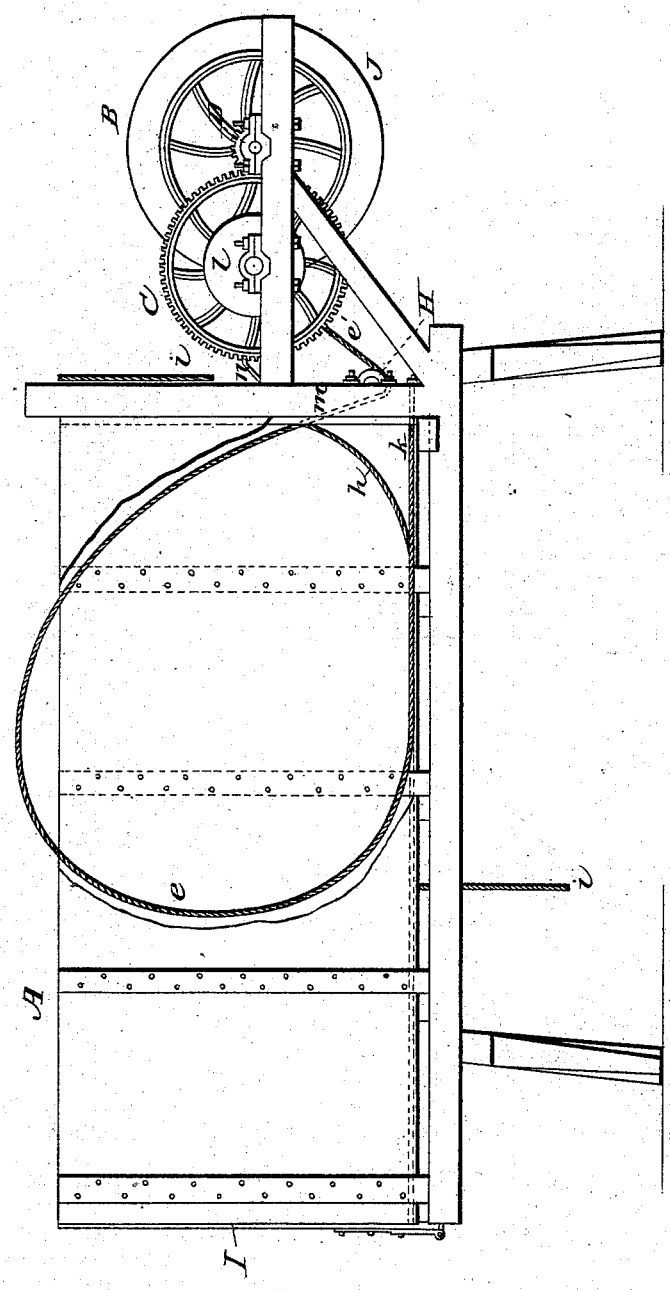

Figure 1 is a top view of the machine, and Fig. 2 is a side view.

Similar letters refer to similar parts in both sheets.

My invention consists of a frame-box, the side A of which is shown in Fig. 2. At the rear end of the box is a dropping door, I, hinged below. The bottom of the box is made of five or more strips, lengthwise of the box, leaving a space of about one and one-half inch between each of the strips, said strips and open spaces being shown in Fig. 1. The front end of the box is made with an opening the whole width of the front, about three inches wide and about a foot from the bottom of the box. In front of the box is attached a frame, J, to support a double "wheel and axle" power. Immediately in front of and fitted in the frame of the box is a roller, H. At the end of axle F is a wheel or pulley, in which is a deep groove, and also attached to the same end of the axle is a crank, so that the machine can be operated by hand or by horse or steam power. Three or more straps or ropes, *e*, are fastened in the frame of the box at the front in the bottom at *k*, one of the ropes or straps fastened at the front end of each of the open spaces left between the strips of which the bottom of the box is made. From thence they extend back along the said open spaces, and up over the rear end of the box, and so left while the box is being filled with the material to be baled. When the box is filled or that amount put in it desired for one bale, the loose ends of the ropes are brought forward and over the straw or hay, down through the open space left in the front of the box, under the roller H, as is shown by the broken line *m* in Fig. 2, then up, as is shown by *e'* in Fig. 2, and fastened to axle E. The wheel or crank attached to axle F is then turned, and the cog-wheel D, working in cog-wheel C, turns axle E, drawing the ropes *e e*, which roll the hay forward and into a round bale, as represented in Fig. 2, by rope *e*, inside the broken edges of the side of the box.

The twine or wire with which the bale is bound is kept under the box—three or more balls. One end of the twine is passed up through the bottom of the box before any hay or straw is put in, as represented by *i* in Fig. 2, then forward along the bottom and up over the front of the box, and there fastened until the bale is in the form represented in Fig. 2. They are then bound around the bundle. The axles are then reversed, and the ropes or straps removed from around the bale. The door at the rear end of the box is then dropped down, and the bale removed. A ratchet, *n*, is fastened on the frame to work in cogs of wheel C, to hold the power while the twine or wire is being fastened.

I am aware that patents have been granted on baling-machines whose power is applied by wheel and axle, but not in manner and substance the same as mine. In my machine the power is applied at one end of the box, drawing the hay or straw by direct application of the ropes or straps *e e e* to the material baled, rolling and pressing it at the same time into a compact round bale of the solidity desired.

What I claim, and desire to secure by Letters Patent, is—

In baling-machines, a box, A, in the front end and at the bottom of which are attached, as described and shown, the end of ropes or straps *e e e*, from where the ropes or straps extend back along the bottom of the box, up over the rear end of the box, then, when the box is filled with the material to be baled, to be brought forward and over the material baled down through the opening described in the front end of the box, under the roller H, then up and attached to the axle, to be used as described and shown.

DANIEL TARR.

Witnesses:
P. M. SMITH,
A. G. SMITH.